Aug. 10, 1965  D. M. PIXLEY  3,199,967
METHOD OF PRODUCING HERMETIC SEAL
Filed Aug. 17, 1960  2 Sheets-Sheet 1
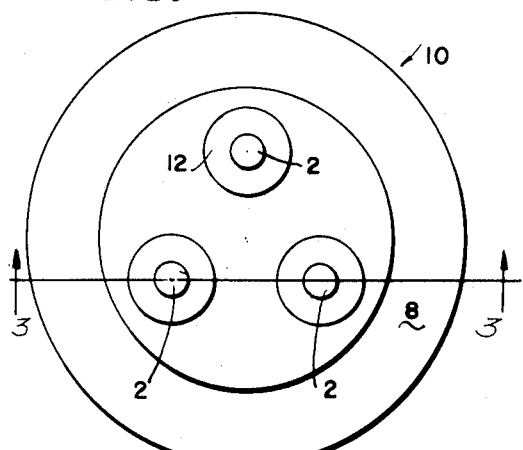
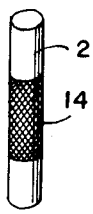
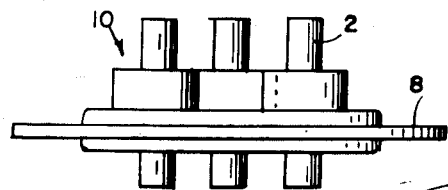
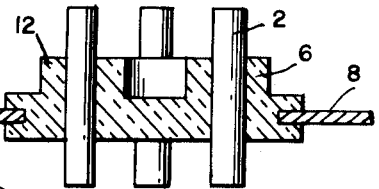
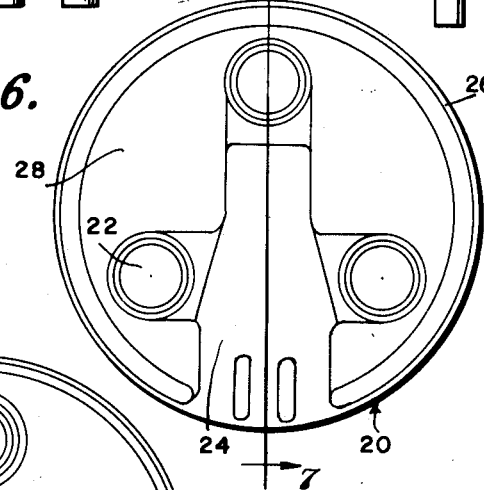
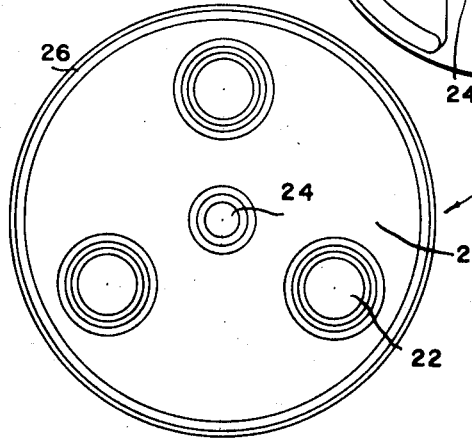
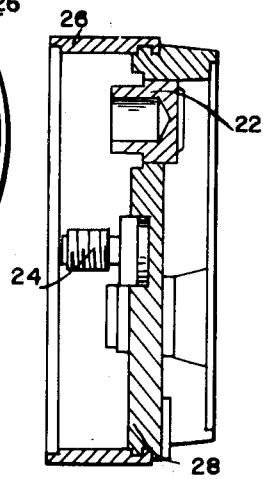
INVENTOR
DAVID M. PIXLEY
BY Cushman, Darby & Cushman
ATTORNEYS

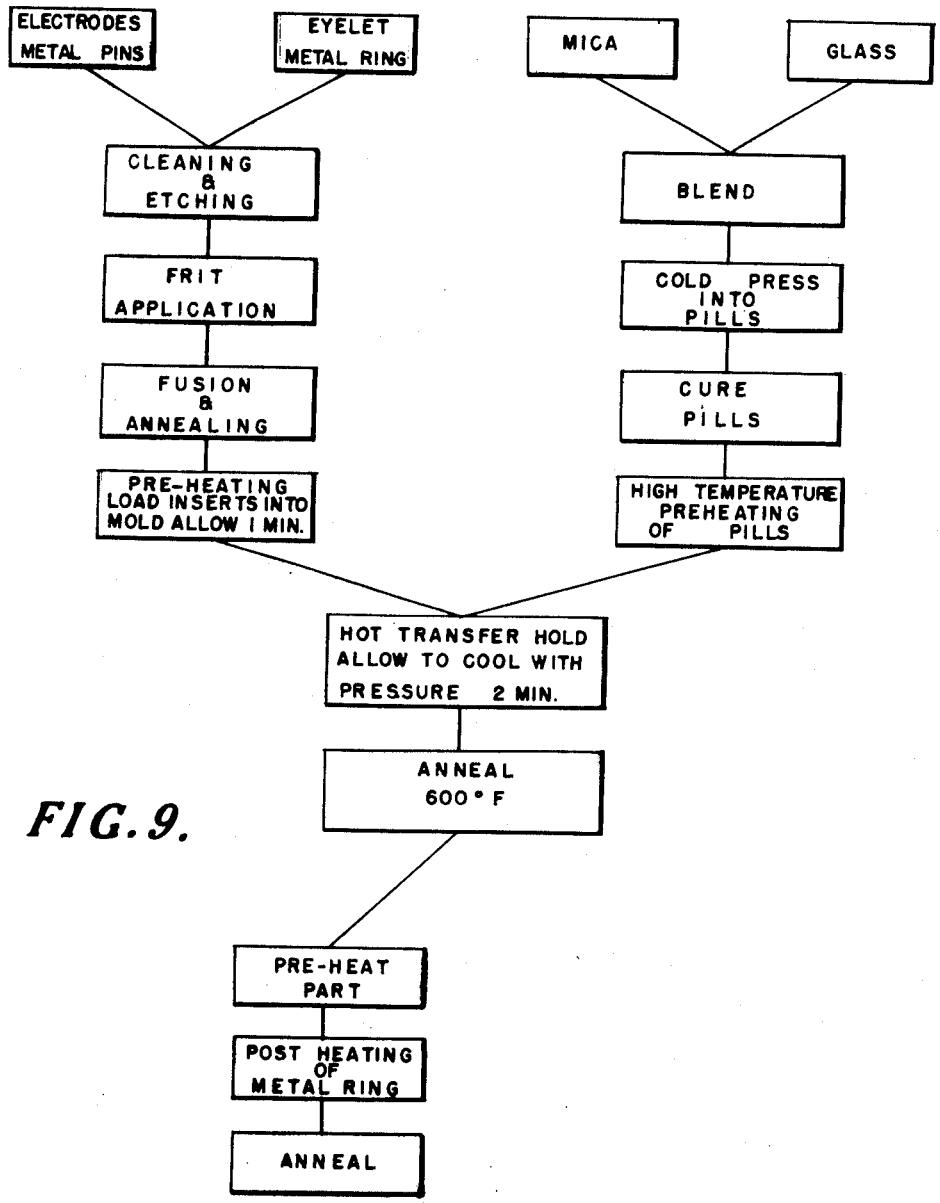

3,199,967
METHOD OF PRODUCING HERMETIC SEAL
David M. Pixley, South Duxbury, Mass., assignor to Haveg Industries, Inc., a wholly owned subsidiary of Hercules Powder Company, New Castle, Del., a corporation of Delaware
Filed Aug. 17, 1960, Ser. No. 50,231
3 Claims. (Cl. 65—50)

The present invention relates to the bonding of metal to a glass-mica insulation composition.

The use of glass bonded mica as an insulating material is well known. Such compositions are available commercially as Mycalex and Havelex. Difficulties have been encountered, however, in making satisfactory seals of glass bonded mica to metals.

It has previously been proposed to prepare a mica bonded glass frit from a mixture of 60% mica and 40% of a frit made from 20% cryolite, 10% barium carbonate, 13% potassium carbonate, 9% sodium carbonate and 48% boric acid. This mica bonded glass frit will adhere to some extent to a wide variety of metals with great difference in coefficient of expansion over a narrow temperature range. This operation as described in Wedlock Reissue Patent No. 22,893 has the disadvantage that it is not suitable when the temperature range of use of the insulator and metal combination is fairly wide, e.g., $-65°$ F. to $+350°$ F. and $-65°$ F. to $+1000°$ F. Furthermore, for best results, it is necessary that the coefficient of expansion of the mica-bonded glass should be close to that of the metal at the temperature range the seal is to operate over. Consequently, a process which can be used with only one type of mica bonded glass has severe limitations.

In normal glass glazing of metal parts the molten glass is held in contact with the equal hot metal until the bond is formed. This can take several minutes. In Havelex or Mycalex molding, it is impossible to hold the metal at the melting temperature of the glass because the Havelex or Mycalex would then stick to the metal mold and no moldings could be made.

Hermetic seals with a leak rate less than $1 \times 10^{-9}$ cc. of air/sec. made from glass-bonded mica by standard molding techniques have never been successful commercially. This is particularly so when the seals are subject to thermal shock conditions and mechanical pressures. The little or no adhesion between the glass bonded mica and the metal causes the failure.

In glass metal seals the cycle of bonding between the glass and metal begins with the formation of a metal oxide layer on the metal insert. This oxide layer is dissolved in the molten glass until the latter comes into contact with the free metal, e.g. iron. However in the molding of glass-bonded mica, the molten glass on contact with the metal inserts chills so quickly that it cannot dissolve the metal oxide layer. For reasons such as those specified above it is not feasible to make a glass-bonded mica hermetic seal by standard glass-metal methods. Thus the use of a conventional glass-metal technique such as melting a sintered preform into and around a metal ring and pins at an elevated temperature for several minutes does not permit the molding of a part having an intricate shape.

It is an object of the present invention to hermetically seal glass bonded mica to metal parts.

Another object is to devise a procedure whereby a wide variety of glass bonded mica compositions can be bonded to metals.

A further object is to prepared improved bonds between glass bonded mica and metals having substantially the same coefficient of expansion.

An additional object is to prepare intricate shapes from glass-bonded mica, the resulting products being hermetically sealed to a leak rate of less than $1 \times 10^{-9}$ cc. of helium/sec.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects are attained by the use of an appropriate series of steps.

(1) The metal part is prebeaded, e.g. with a phosphate, borax or soda-lime glass but preferably with a glass such as a lead borosilicate glass. The metal surfaces to be treated should be thoroughly cleaned.

(2) The thus pretreated metal insert and the glass-mica composition are molded into a part under appropriate conditions of temperature and pressure.

(3) After molding a post sealing operation is employed. In the post sealing high heat is applied substantially only to the metal and not to the glass-bonded mica. The heat generated at the metal-glass interface of the metal ring in this step assures the final bonding necessary for a good rugged hermetic seal. The use of small jet gas-oxygen burners, strip electric heaters or induction heaters can be employed to give the selective heating.

In the accompanying drawing, in which like reference characters indicate like parts, FIGURE 1 is a top plan view of a multiple electrode structure made in accordance with the present invention;

FIGURE 2 is a vertical elevation of the electrode structure of FIGURE 1;

FIGURE 3 is a sectional view along the lines 3—3 of FIGURE 1;

FIGURE 4 is a side elevation of a metal electrode treated according to the invention;

FIGURE 5 is a side elevation of a metal electrode having an alternative treatment in accordance with the invention;

FIGURE 6 is a back view of a hermetic terminal made according to the invention;

FIGURE 7 is a sectional view along the line 7—7 of FIGURE 6;

FIGURE 8 is a front view of the hermetic terminal of FIGURE 6; and

FIGURE 9 is a box diagram outlining the preferred mode of operation.

The present invention is related and an improvement upon the invention disclosed in Bischoff application 818,892 filed June 8, 1959 now abandoned. The entire disclosure of the Bischoff application is hereby incorporated by reference.

Referring to FIGURE 9 the metal parts, e.g., electrodes, eyelet or metal ring are cleaned etched in conventional fashion, e.g. aqua regia, mixed nitric and hydrofluoric acids (15% nitric acid and 3% hydrofluoric acid by volume with 12–15% chrome steel) or even hydrochloric acid alone. For 28% chrome steel a 1:1:1 mixture by volume of water, nitric acid and hydrochloric acid can be used. For a 6% chrome steel, a more diluted acid is preferred. As the metal there can be employed steel, copper, aluminum, tungsten, platinum, tantalum, titanium, silver, beryllium, etc.

To clean the metal surface prior to etching there can be employed a conventional degreaser, e.g. an alkaline cleaning solution such as aqueous sodium phosphate.

After the etching step the metal parts are dipped in the bonding medium or the bonding medium is sprayed on the metal. Preferably a lead borate glass is employed in this frit application step. In place of glass, less preferably, there can be employed borates such as borax, trisodium phosphate, tripotassium phosphate and sodium tetraphosphate in this step.

The metal parts having the frit coating are placed in a furnace of either the open burner or induction type and heated to 1200 to 1800° F., preferably 1500° F. in a fusion and annealing step. This step makes for a tough bond between the glass bonded mica and the steel or other metal in the subsequent operation.

The metal parts having the frit applied thereto are then loaded into the transfer mold at 600 to 800° F., preferably 675° F., and kept there for sufficient time to soak. Usually one minute is sufficient.

In the meantime the glass and mica are blended in conventional manner, e.g. 55% lead borate, 40% mica and 5% cryolite. This mixture is cold pressed into pills which are then cured by driving off any water present, e.g. at 400 to 450° F., preferably 450° F.

The cured pills are then preheated at a high temperature, e.g. 1200 to 1400° F., preferably 1400° F. for 30 minutes to 1 hour and placed into the transfer mold.

The preheated glass bonded metal parts and the preheated glass bonded mica are molded in the hot transfer mold and allowed to cool under pressure for ½ to 1 minute, preferably one minute. The pressure in the transfer mold is preferably 3 to 10 tons/sq. in., eg. 5 tons/sq. in., but can be lower, e.g. 600 to 2400 p.s.i. The temperature in the transfer mold is 600–800° F. The molded part is then removed and placed in an oven and annealed at 550 to 700° F., preferably 600° F., to remove and prevent undesired stresses in the glass.

The molded part is then preheated at 550 to 700° F. and the metal ring is post heated at 1100 to 1500° F., preferably 1300° F. by the use of an induction heater, a small jet gas oxygen burner or strip electric heaters. The glass bonded to the metal ring is actually refused and assures the final bonding necessary for a good rugged hermetic part. It is critical in this post sealing operation that high heat be applied to the metal ring but not to the glass bonded mica (Havelex or Mycalex) body.

After the post sealing the finished part is annealed at 550 to 700° F., preferably 600° F.

Referring more specifically to FIGURES 1–4 of the drawings, there are provided a plurality of metal electrodes 2, e.g. stainless steel clad copper electrodes, and metal ring or eyelet 8. The electrodes and eyelet are cleaned and etched in conventional fashion and then lead borate glass (CG–5) is sprayed on them to form a bonding coat 4. The metal coated parts are heated to 1500° F. in an induction furnace for 2 minutes to fuse the glass to the metal. The thus formed objects are preheated in a mold (not shown) for one minute at 700° F. In the meantime, an insulating composition composed of 55% lead borate glass, 40% mica and 5% cryolite is blended together, cold pressed into pills and the pills cured at 450° F. Then the pills are heated at 1400° F. for 45 minutes. The electrodes 2 and the eyelet 8 which surrounds the electrodes having the bonding coat 4 are molded by the insulating composition 6 in a heat transfer mold (not shown) with a pressure of 5 tons/sq. in. applied at 700° F. The ring 8 is adapted to be suitably secured in a piece of electric equipment. The article prepared is denoted generically at 10. The insulating material 6 has extensions 12 integral therewith which surround the electrodes to provide further insulation. After removal from the hot transfer mold the formed article is annealed at 600° F. for 30 min. The part is then preheated at 600° F. and the metal ring post heated to 1300° F., with the aid of an induction heater (not shown). The finished part 10 is then annealed at 600° F.

In place of applying a bonding coat 4 as in FIGURE 4, less preferably as shown in FIGURE 5, the etched surface 14 of the electrodes 2 can be directly bonded to the glass-mica insulating composition.

FIGURES 6–8 illustrate a more complex article 20 which can be made according to the invention. The article 20 has three metal terminals 22, a metal mounting post 24 and an outer metal ring 26 hermetically sealed with the glass bonded mica body 28. The metal parts are sealed to the glass bonded mica body with the aid of a glass frit in the manner described in connection with the preparation of the article shown in FIGURES 1–4. The resulting article evidenced no measurable helium tracer leakage on mass spectrometer test equipment operating to a sensitivity of $1 \times 10^{-9}$ cc./sec. range.

The hermetic seal is maintained over a temperature range of $-65°$ F. to $+1000°$ F.

Typical formulations for making the glass bonded mica include those made by mixing 50 to 75 parts of comminuted mica with about 50 to 25 parts of unmodified lead borate containing 5 to 8% of raw cryolite based on the lead borate. Examples of suitable materials are set forth in Buechner Patent No. 2,400,337. There can also be used a leadless glass bonded mica composition such as any of those set forth in Michael Patent No. 2,566,902. Such formulations contain by weight 45 to 85% mica and a binder comprising the vitrefied product of a mixture consisting of 11 to 21% aluminum trihydrate, 7 to 21% of barium or strontium carbonate, 37 to 67% boric acid and a fluoride from the class of cryolite, sodium fluoride, sodium silico fluoride, sodium potassium fluoride, potassium fluoroborate, sodium fluoroborate, calcium fluoride, beryllium fluoride, potassium aluminum fluoride and potassium silico fluoride, the fluoride being present in an amount equivalent to 10 to 32% cryolite based on the fluoride content of the fluoride. A specific example of such a composition contains 85% of mica and 15% of a mixture made up of 20.5% cryolite, 9.6% barium carbonate, 15.5% aluminum hydrate and 54.4% boric acid.

What I claim is:

1. A method of improving the bond of a glass-mica insulating composition to a metal insert comprising prebeading the metal insert with a fused glass composition which will bond to both the metal and to the glass-mica composition, molding an article from the prebeaded metal insert and the glass-mica composition at 3 to 10 tons/sq. in. at a temperature of 600–800° F., annealing the molded article at atmospheric pressure at a temperature of 600–800° F., and post heating the metal insert at a temperature of 1100° to 1500° F. to refuse the glass at the metal insert while avoiding substantial postheating of the glass-mica portion of the molded article.

2. A method according to claim 1 wherein the glass is a lead borate glass.

3. A process according to claim 1 wherein the post heating is accomplished by induction heating.

References Cited by the Examiner

UNITED STATES PATENTS

| 2,317,305 | 4/43 | Schwartzwalder | 189—36.5 |
|---|---|---|---|
| 2,429,955 | 10/47 | Goldsmith | 65—43 X |
| 2,462,205 | 2/49 | Machlett et al. | 65—40 |
| 2,568,460 | 9/51 | Nolte | 65—40 |
| 2,903,826 | 9/59 | Monack | 65—22 |

DONALL H. SYLVESTER, *Primary Examiner.*

ARTHUR P. KENT, *Examiner.*